United States Patent
Viitala et al.

(10) Patent No.: US 11,662,420 B2
(45) Date of Patent: May 30, 2023

(54) INDOOR OPTIMIZED OFFLINE RADIO MAP

(71) Applicant: HERE Global B.V., Eindhoven (NL)

(72) Inventors: Mika Viitala, Tampere (FI); Marko Luomi, Tampere (FI)

(73) Assignee: HERE GLOBAL B.V., Eindhoven (NL)

(*) Notice: Subject to any disclaimer, the term of this patent is extended or adjusted under 35 U.S.C. 154(b) by 395 days.

(21) Appl. No.: 16/921,681

(22) Filed: Jul. 6, 2020

(65) Prior Publication Data

US 2021/0011113 A1   Jan. 14, 2021

(30) Foreign Application Priority Data

Jul. 10, 2019  (EP) .................................... 19185594

(51) Int. Cl.
  *G01S 5/02*   (2010.01)
  *H04B 17/391*  (2015.01)

(52) U.S. Cl.
  CPC ...... *G01S 5/02523* (2020.05); *G01S 5/02525* (2020.05); *H04B 17/391* (2015.01)

(58) Field of Classification Search
  CPC ............. G01S 5/02523; G01S 5/02525; H04B 17/391
  See application file for complete search history.

(56) References Cited

U.S. PATENT DOCUMENTS

| | | | |
|---|---|---|---|
| 2004/0259581 A1* | 12/2004 | Crisler | H04W 8/186 455/518 |
| 2007/0093213 A1* | 4/2007 | Filizola | G01R 29/0857 340/8.1 |
| 2013/0183999 A1 | 7/2013 | Jovicic et al. | |
| 2016/0161591 A1 | 6/2016 | Wirola et al. | |

(Continued)

FOREIGN PATENT DOCUMENTS

EP   3 418 763 A1   12/2018

OTHER PUBLICATIONS

Extended European Search Report for Application No. 19185594.9 dated Feb. 28, 2020, 7 pages.

(Continued)

*Primary Examiner* — Natasha W Cosme
(74) *Attorney, Agent, or Firm* — Here Global B.V.; Jeffrey R. Moisan (57) ABSTRACT

A method includes obtaining or holding available first radio map information representing a first radio map for a first environment. The method also includes determining, at least partially based on said first radio map information, second radio map information representing a second radio map for a second environment. The second radio map contains or represents a respective radio coverage model for each radio device of a group of radio devices. A portion of the second environment at least partially covers the first environment. A density of radio coverage models contained in or represented by said second radio map in the portion of said second environment and at least partially covering the first environment is higher than a density of radio coverage models contained in or represented by the second radio map in a remaining portion of the second environment. A corresponding apparatus and computer program product are also provided.

15 Claims, 4 Drawing Sheets

(56) References Cited

U.S. PATENT DOCUMENTS

2017/0219359 A1    8/2017  Elhoushi et al.
2018/0275261 A1*   9/2018  Khan .................. G01S 5/02521

OTHER PUBLICATIONS

Wirola, L. et al., *Bandwidth and Storage Reduction of Radio Maps for Offline WLAN Positioning*, IEEE, International Conference on Indoor Positioning and IndoorNavigation (Oct. 2013) 11 pages.
Connelly, K. et al., *A Toolkit for Automatically Constructing Outdoor Radio Maps*, International Conference on Information Technology: Coding and Computing (ITCC'05)—vol. II (Apr. 2005) 8 pages.

* cited by examiner

INDOOR OPTIMIZED OFFLINE RADIO MAP

CROSS-REFERENCE TO RELATED APPLICATIONS

This application claims priority to European Application No. 19185594.9, filed Jul. 10, 2019, the entire contents of which are incorporated herein by reference.

FIELD OF THE INVENTION

The invention relates to the field of radio positioning (e.g. of a mobile device) based on a radio map represented by radio map information and more specifically to determining, at least partially based on first radio map information, second radio map information.

BACKGROUND OF THE INVENTION

In the field of radio positioning (e.g. network based positioning), positioning systems for example rely on radio map information representing respective radio maps. A radio map for a certain environment may contain or represent a respective radio coverage model for each radio device of a plurality of radio devices transmitting (e.g. broadcasting) radio signals that are expected to be observable at one or more positions within the certain environment covered by the radio map. For example, positioning algorithms use these radio map information for estimating the position of a mobile device within the certain environment. Typically, positioning based on radio maps can be performed in two different ways using online radio maps or offline radio maps. When using an online radio map, the online radio map is stored on a server, which may perform the positioning for a mobile device after receiving radio measurements observed and send by the mobile device to the server. In this case, positioning can be performed without downloading the online radio map from the server to the mobile device, but a data connection between the server and the mobile device is required to send radio measurements observed by the mobile device to the server. When using an offline radio map, radio map information representing an offline radio map is provided such that it is downloadable or retrievable by the mobile device prior to estimating a position of the mobile device and estimating the position may be performed locally on the mobile device without requiring a data connection between server and mobile device during positioning.

Offline radio maps are usually optimized for positioning in remote outdoor regions, where only unstable data connection or no data connection between the mobile device and the server is available and performing positioning locally at the mobile device is preferred over positioning based on online radio maps. Due to this optimization of offline radio maps for outdoor use, only poor positioning performance may be achieved when the mobile device is located indoors. This disadvantage may be further worsened by the fact that alternative position technologies based on satellite signals (e.g. satellite signals of the global positioning system, GPS) cannot be used to mitigate the poor indoor positioning performance, since satellite signals do not penetrate through walls and roofs strongly enough for an adequate signal reception indoors. In practice, these conditions may lead to unavailable or at least inaccurate position estimates indoors.

SUMMARY OF SOME EMBODIMENTS OF THE INVENTION

It is inter-alia an object of the present invention to improve indoor positioning based on an offline radio map.

According to an exemplary aspect of the invention, a method performed by an apparatus is disclosed, wherein the method comprises:
  obtaining or holding available first radio map information representing a first radio map for a first environment;
  determining, at least partially based on the first radio map information, second radio map information representing a second radio map for a second environment,
wherein the second radio map contains or represents a respective radio coverage model for each radio device of a group of radio devices, wherein a portion of the second environment at least partially covers the first environment, and wherein a density of radio coverage models contained in or represented by the second radio map in the portion of the second environment at least partially covering the first environment is higher than a density of radio coverage models contained in or represented by the second radio map in a remaining portion of the second environment.

For example, the disclosed method may serve for determining, at least partially based on first radio map information, second radio map information representing a second radio map.

The second radio map may be an offline radio map for providing to a mobile device for estimating the position of the mobile device.

For example, the apparatus performing the method may be a server.

A radio map for a certain environment (e.g. the first radio map for the first environment or the second radio for the second environment) may be understood to cover this certain environment (e.g. the first radio map may cover the first environment and the second radio map may cover the second environment). Such an environment covered by a radio map may for example be a venue, a region and/or an area covered by the radio map. A few non-limiting examples of such an environment covered by a radio map (e.g. the first radio map or the second radio map) are indoor environments like an inside of a building and/or a complex of buildings (e.g. a shopping center, a parking garage, an airport, a company site, etc.) and/or outdoor environments like a geographic area or region (e.g. a town area, a city area, a city park, a plaza, a corner of a street, a section of a pavement along a street, a hiking region, etc.). It is also to be understood that a radio map may cover at least one of an indoor environment, an outdoor environment or a combination thereof. A radio map for an indoor environment may be referred to as indoor radio map, a radio map for an outdoor environment may be referred to as outdoor radio map and a radio map for a combination of an outdoor environment and an indoor environment may be referred to as combined outdoor and indoor radio map.

Radio map information representing a radio map for a certain environment (e.g. the first radio map information representing the first radio map for the first environment or the second radio map information representing the second radio map for the second environment) may be configured to enable estimating a position of a mobile device based on radio signals that are observable and/or observed by the mobile device at a certain position in this certain environment. Therein, a radio signal may be understood to be observable at a certain position if the radio signal is receivable with a minimum quality (e.g. a minimum signal-tonoise ratio and/or a minimum signal power, e.g. at least −90 dbm or −95 dbm) at this position.

A radio map for a certain environment (e.g. the first radio map for the first environment or the second radio map for the second environment) may contain or represent a respective radio coverage model for each radio device of a plurality of radio devices transmitting (e.g. broadcasting) radio signals that are expected to be observable at one or more positions within the certain environment covered by the radio map (e.g. the first environment covered by the first radio map or the second environment covered by the second radio map). For example, the radio map may contain or represent a respective radio coverage model for a plurality of radio devices transmitting (e.g. broadcasting) radio signals that are expected to be observable at one or more positions within the certain environment. A respective radio coverage model for a respective radio device of the plurality of radio devices may be understood to represent at least the expected radio coverage of the respective radio device. For example, the radio coverage model of such a radio device may describe the coverage area within which radio signals transmitted (e.g. broadcasted) by this radio device are expected to be observable. An example of such a radio coverage model of a certain radio device is a geometric model like a geometric shape representing the expected coverage area of this radio device within which it is expected that a radio signal transmitted (e.g. broadcasted) by this radio device is observable (e.g. receivable with a minimum quality, e.g. a minimum signal-to-noise ratio and/or a minimum signal power, e.g. at least −90 dbm or −95 dbm). Another example of such a radio coverage model of a certain radio device is a matrix model like a radio image representing an expected radio signal strength field of a radio signal transmitted (e.g. broadcasted) by this radio device. It is however to be understood that real radio coverage of such a radio device may deviate from the expected radio coverage as described by such a radio coverage model.

According to a non-limiting example of estimating a position of a mobile device, the mobile device may observe at its current position one or more radio signals, each of which is transmitted (e.g. broadcasted) by a respective radio device of a group of radio devices; and, based on radio map information representing a radio map containing or representing a respective geometric model as radio coverage model for each radio device of the group of radio devices, the current position of the mobile device may then be estimated to be the position (or area) at (or in) which the geometric models of the radio devices transmitting the observed one or more radio signals overlap. Accordingly, this position (or this area) may be used as position estimate for the current position of the mobile device.

Obtaining the first radio map information may be understood to mean that the first radio map information is for example received by the apparatus performing the disclosed method (e.g. a server) from another apparatus (e.g. another server). Alternatively or additionally, the first radio map information may be held available by the apparatus performing the disclosed method, for example by storing the first radio map information in memory means of the apparatus.

Determining, at least partially based on the first radio map information, the second radio map information representing the second radio map may be understood to mean that the determining depends on the first radio map information. It is however to be understood that the determining may optionally depend on further information (e.g. further radio map information representing a third radio map covering a third environment or other information, like information on locations and number of radio devices that are not contained in or represented by the first radio map and from which a respective radio signal is still observable in the first environment and/or the second environment).

The determining may be performed according to predetermined rules like a predetermined algorithm. To give a non-limiting example and as disclosed in more detail below, such an algorithm may comprise selecting, at least partially based on the first radio map information, one or more radio devices for which the second radio map may contain or represent a respective radio coverage model; and determining the second radio map information such that the second radio map represented by the second radio map information contains or represents a respective radio coverage model for each radio device of the group of radio devices. For example, the group of radio devices may be selected such that it is formed by radio devices transmitting (e.g. broadcasting) respective radio signals that are expected to be observable at one or more positions within the second environment.

For example, the second radio map represented by the second radio map information may be different from the first radio map represented by the first radio map information. This may be understood to mean at least one of: (1) the types of the first radio map and the second radio map are different (e.g. the first radio map may be an online radio map and the second radio map may be an offline radio map and/or the first radio map may be an indoor radio map and the second radio map may be an outdoor map or a combined indoor and outdoor radio map), (2) radio devices and/or a number of radio devices and/or a type of radio devices for which the first radio map contains or represents respective radio coverage models may be at least partially different from radio devices and/or a number of radio devices and/or a type of radio devices for which the second radio map contains or represents respective radio coverage models, (3) the first environment covered by the first radio map may be different (e.g. smaller or larger in size) than the second environment covered by the second radio map, or (4) a combination thereof, to name a few non-limiting examples.

A portion of a certain environment may be understood to be a section of the environment, for example a subarea of an area or a subregion of a region or a section of a venue corresponding to the environment.

That the portion of the second environment at least partially covers (e.g. overlaps) the first environment may be understood to mean one of: (1) the portion of the second environment corresponds to the first environment (i.e. the first environment is entirely covered by the second environment and is entirely inside the second environment) or (2) the portion of the second environment corresponds to a portion of the first environment (i.e. the first environment is only partially covered by the second environment and is partially outside of the second environment). Accordingly, the remaining portion of the second environment may be understood to correspond to the portion of the second environment that does not cover (e.g. overlap) the first environment.

The density of radio coverage models contained in or represented by a certain radio map for a certain environment (e.g. the second radio map for the second environment) in a given portion of the certain environment (e.g. the portion of the second environment at least partially covering the first environment or the remaining portion of the second environment) may be understood to depend on the number of radio coverage models representing a respective radio coverage at least partially covering the given portion and the surface area of the given portion. To give a non-limiting example, the density of radio coverage models contained in or represented by a certain radio map for a certain environment (e.g. the second radio map for the second environment) in a given portion of the certain environment (e.g. the portion of the second environment at least partially covering the first environment or the remaining portion of the second environment) may correspond to the number of radio coverage models representing a respective radio coverage at least partially covering the given portion per surface area of the given portion. As disclosed above, a certain radio coverage model for a certain radio device may describe the coverage area within which radio signals transmitted (e.g. broadcasted) by this radio device are expected to be observable. Accordingly, a certain radio coverage model for a certain radio device may be understood to represent a respective radio coverage at least partially covering a certain portion of a certain environment (e.g. the portion of the second environment at least partially covering the first environment or the remaining portion of the second environment) if the coverage area described (e.g represented) by this radio coverage model at least partially covers (e.g. overlaps) this portion and/or it is expected based on this radio coverage model that radio signals transmitted (e.g. broadcasted) by this radio device are expected to be observable at one or more positions within this portion. It is however to be understood that the invention is not limited to this and that other ways for defining the disclosed density of radio coverage models (e.g. without adhering to a number of radio coverage models per surface area) may be used as well.

For example, the density of radio coverage models contained in or represented by a certain radio map for a certain environment (e.g the second radio map for the second environment) in a certain portion of the certain environment (e.g. the portion of the second environment at least partially covering the first environment or the remaining portion of the second environment) may be considered as simple measure for how accurate a position of a mobile device located in this portion of the certain environment may be estimated based on the certain radio map and based on radio signals observed by the mobile device. For example, it may be considered that the greater the number of observable radio signals at a certain position the greater the accuracy of estimating the certain position based on certain radio map information representing a certain radio map (e.g. the second radio map information representing the second radio map). Accordingly, a higher density of radio coverage models may be considered to be indicative that it is likely that a position is estimated with a higher accuracy in comparison to a lower density of radio coverage models, because a higher density of radio coverage models indicates that it is more likely that a greater number of radio signals is expected to be observable at any position of this portion than for a lower density of radio coverage models.

Thus, the density of radio coverage models contained in or represented by the second radio map in the portion of the second environment at least partially covering the first environment that is higher than the density of radio coverage models contained in or represented by the second radio map in the remaining portion of the second environment may be considered to indicate that it is likely that a greater number of radio signals is observable at any position of the portion of the second environment at least partially covering the first environment than in the remaining portion of the second environment. This is particularly advantageous in cases in which it is expected that the propagation or observation of radio signals may be more affected in the portion of the second environment at least partially covering the first environment than in the remaining portion of the second environment. This may for example be the case in cases in which the portion of the second environment at least partially covering the first environment is inside a building or a complex of buildings and the remaining portion of the second environment is at least partially outside of a building or a complex of buildings. In such cases, the second radio map may for example be an indoor radio map.

For example, it is advantageous to determine the second radio map information representing the second radio map at least partially based on the first radio map information representing the first radio map, which may be for example an indoor radio map as disclosed above. That is because the second radio map may be determined based on an already existing (e.g. existing before the disclosed method is performed) indoor radio map as first radio map, which for example may lead to less effort when determining the second radio map. As an example, an indoor radio map as first radio map may be guaranteed to be optimized for positioning estimation indoors within the first indoor environment, for example because the first radio map information representing the first radio map may have been determined based on a certain method (e.g. a particularly elaborate method such as manually collecting WLAN observation reports, for example by using special equipment for this purpose). In this example, determining the second radio map information representing the second radio map at least partially based on the first radio map information may be advantageous, because the second radio map may then be determined as indoor optimized radio map without having to repeat the certain method.

If for example the second radio map is an offline radio map, it may be the case that the second radio map must correspond to a restriction in size (e.g. restriction in size of data volume that is needed for storing or transferring second radio map information representing the second radio map). In this respect, determining the second radio map information representing the second radio map at least partially based on the first radio map information may be advantageous, because the determining may comprise a step of selecting, at least partially based on the first radio map information, a group of radio devices from a plurality of radio devices, for which group the second radio map may contain or represent a respective radio coverage model. As an advantage, this selecting may performed such that the restriction in size is met, while the second radio map may still be optimized for positioning estimation indoors within the second indoor environment.

In particular, the fact that an indoor radio map exists for a first indoor environment may be considered to indicate that this first environment is of importance with respect to position estimating (e.g. because it is expected that propagation or observation of radio signals may be affected in this environment) and that a second radio map should be optimized for positioning estimating in this first environment. Thus, the disclosed method may for example be advantageous when making use of already existing knowledge on which environments are important with respect to position estimating. For example, the second radio map may be determined in an automatic fashion without manual user input (e.g. without for example manually selecting one or more radio devices) by a user of the apparatus performing the disclosed method, which would be cumbersome and prone to errors.

According to a further exemplary aspect of the invention, an apparatus (e.g. the apparatus performing the above disclosed method) is disclosed, wherein the apparatus comprises means for performing any one embodiment of the disclosed method (e.g. the steps of any one embodiment of the disclosed method) or a part thereof (e.g. at least some steps of any one embodiment of the disclosed method).

The means of the disclosed apparatus can be implemented in hardware and/or software. They may comprise for example a processor for executing computer program code for realizing the required functions, a memory storing the program code, or both. Alternatively, they could comprise for example circuitry that is designed to realize the required functions, for example implemented in a chipset or a chip, like an integrated circuit. The disclosed apparatus may comprise a single means for all functions, a common plurality of means for all functions, or a plurality of different means for different functions.

According to a further exemplary aspect of the invention, an apparatus (e.g. the apparatus performing the above disclosed method) is disclosed, wherein the apparatus comprises at least one processor and at least one memory containing computer program code, the at least one memory and the computer program code with the at least one processor configured to cause the apparatus at least to perform any one embodiment of the disclosed method (e.g. the steps of any one embodiment of the disclosed method) or a part thereof (e.g. at least some steps of any one embodiment of the disclosed method).

For example, the disclosed apparatus(es) may be (a) module(s) or component(s) for (a) server (s), for example (a) chip(s) or chipset(s). Alternatively, the disclosed apparatus(es) may be (a) server(s) or part of a plurality of servers or a plurality of servers (e.g. forming a server cloud representing the disclosed apparatus). For example, the disclosed apparatus(es) may support position estimating of a mobile device, for example by determining the second radio map information which may be used by the mobile device to estimate its position.

It is to be understood that the disclosed apparatus(es) may comprise only the disclosed components (e.g. means) or may further comprise one or more additional components (e.g. means). Examples of such additional components are a communication interface (e.g. wireless communication interface or a wired communication interface), a user interface (e.g. a touch-sensitive display, a keyboard, a touchpad, a display, etc.), etc.

According to a further exemplary aspect of the invention, a system is disclosed which comprises at least one of (1) the disclosed apparatus(es) (e.g. a server) and (2) a mobile device.

Optionally, the system may further comprise further apparatuses, for example additional apparatuses like an apparatus (e.g. a server) from which the apparatus performing the disclosed method may receive the first radio map information and/or an apparatus (e.g. a server) to which the apparatus performing the disclosed method may send the second radio map information.

Moreover, the system may further comprise one or more radio devices, such as for example the above disclosed group of radio devices (e.g. a group of WLAN access points).

According to a further exemplary aspect of the invention, a non-transitory computer readable storage medium is disclosed, in which computer program code is stored. The computer program code causes an apparatus to perform any one embodiment of the disclosed method (e.g. the steps of any one embodiment of the disclosed method) when executed by a processor or by a plurality of processors. The computer program code could be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

According to a further exemplary aspect of the invention, a computer program code is disclosed, the computer program code when executed by a processor (or by a plurality of processors) causing an apparatus to perform any one embodiment of the disclosed method (e.g. the steps of any one embodiment of the disclosed method).

The disclosed method, apparatus(es), system, non-transitory computer readable storage medium and computer program code may be for determining, at least partially based on first radio map information, second radio map information representing a second radio map.

In the following, further features and embodiments of the above disclosed exemplary aspects of the invention will be described.

According to an exemplary embodiment of the invention, the method further comprises:
  providing the second radio map information representing the second radio map such that it is receivable or retrievable by a mobile device.

Providing the second radio map information representing the second radio map such that it is receivable or retrievable by a mobile device may be understood to mean that the second radio map information is (e.g. directly or indirectly) made available to the mobile device by the apparatus performing the disclosed method.

As an example for making the second radio map information directly available to the mobile device, providing the second radio map information representing the second radio map such that it is retrievable by a mobile device may be understood to mean that, when a request for the second radio map information is received from the mobile device, the second radio map information is send, by the apparatus performing the disclosed method, to the mobile device; and, providing the second radio map information representing the second radio map such that it is receivable by a mobile device may be understood to mean that the second radio map information is send to the mobile device or broadcasted such that it is receivable by the mobile device and, optionally, further mobile devices.

As an example for making the second radio map information indirectly available to the mobile device, providing the second radio map information representing the second radio map such that it is receivable or retrievable by a mobile device may be understood to mean that the second radio map information is sent by the apparatus performing the disclosed method to another apparatus, wherein the other apparatus makes the second radio map information directly available to the mobile device (e.g. by sending or broadcasting the second radio map information to the mobile device as disclosed above in more detail).

It is to be understood that the requesting, sending or broadcasting in the context of retrieving or receiving the second radio map information may be understood to be automatically (e.g. according to a predetermined schedule or according to predetermined rules) or manually (e.g. by control of a user of the mobile device) performed.

The providing the second radio map information representing the second radio map such that it is receivable or retrievable by the mobile device may be performed prior to a position estimating by the mobile device based on the second radio map. This may enable the mobile device to hold the second radio map information locally available (e.g. by storing the second radio map information in a memory of the mobile device), for example if the second radio map is an offline radio map.

According to an exemplary embodiment of the invention, the density of radio coverage models contained in or represented by the second radio map in the portion of the second environment at least partially covering the first environment is a function of at least one of the following:
  a number of radio coverage models contained in or represented by said second radio map in the portion; and
  a surface area of the portion of the second environment.

According to the same or another exemplary embodiment of the invention, the density of radio coverage models contained in or represented by the second radio map in the remaining portion of the second environment is a function of at least one of the following:
  a number of radio coverage models contained in or represented by the second radio map in the remaining portion; and
  a surface area of the remaining portion of the second environment.

That the density of radio coverage models contained in or represented by the second radio map in a certain portion of the second environment (e.g. the portion of the second environment at least partially covering the first environment or the remaining portion of the second environment) is a function of the number of radio coverage models or the surface area as disclosed above may be understood to mean that the density of radio coverage models contained in or represented by the second radio map in this portion of the second environment is determined (e.g. calculated or computed) at least partially depending on at least one of them.

As disclosed above, the density of radio coverage models contained in or represented by the second radio map in a certain portion of the second environment (e.g. the portion of the second environment at least partially covering the first environment or the remaining portion of the second environment) may correspond to the number of radio coverage models representing a respective radio coverage at least partially covering the certain portion per surface area of the certain portion. In particular, the density of radio coverage models contained in or represented by the second radio map in a certain portion of the second environment (e.g. the portion of the second environment at least partially covering the first environment or the remaining portion of the second environment) may be determined by dividing the number of radio coverage models representing a respective radio coverage at least partially covering the certain portion by unit surface area of the certain portion. Therein, a certain radio coverage model for a certain radio device may be understood to represent a respective radio coverage at least partially covering a certain portion of the second environment (e.g. the portion of the second environment at least partially covering the first environment or the remaining portion of the second environment) if the coverage area described (e.g represented) by this radio coverage model at least partially covers (e.g. overlaps) this portion and/or it is expected based on this radio coverage model that radio signals transmitted (e.g. broadcasted) by this radio device are expected to be observable at one or more positions within this portion.

Alternatively or additionally, the density of radio coverage models contained in or represented by the second radio map in a certain portion of the second environment (e.g. the portion of the second environment at least partially covering the first environment or the remaining portion of the second environment) may depend on whether the radio coverage models contained in or represented by the second radio map in this portion are distributed homogeneous or inhomogeneous across this portion.

According to an exemplary embodiment of the invention, the determining second radio map information comprises:
  selecting, at least partially based on the first radio map information, the group of radio devices from a plurality of radio devices, wherein a respective radio signal from each radio device of the plurality of radio devices is observable in the second environment.

Selecting, at least partially based on the first radio map information, the group of radio devices from the plurality of radio devices may be understood to mean that the selecting depends on the first radio map information. For example, the group of radio devices may be selected from the plurality of radio devices such that it is expected that at any position of the portion of the second environment at least partially covering the first environment a first predetermined number (e.g. 5 or 6) of radio signals is observable and at any position of the remaining portion of the second environment a second predetermined number (e.g. 3 or 4) of radio signals is observable. To this end, the group of radio devices may be selected such that at any position of the portion of the second environment at least partially covering the first environment a first predetermined number of overlapping radio coverages (i.e. corresponding to the first predetermined number of radio signals) is represented by the radio coverage models of the radio devices of the group of radio devices and at any position of the remaining portion of the second environment a second predetermined number of overlapping radio coverages (i.e. corresponding to the second predetermined number of radio signals) is represented by the radio coverage models of the radio devices of the group of radio devices. For example, for each radio device of the plurality of radio devices or of the group of radio devices, respective radio coverage model information representing a radio coverage model of the respective radio device of the plurality of radio devices may be held available (e.g. by storing the respective radio coverage model in a memory of the apparatus performing the disclosed method). It is however to be understood that the selecting may optionally depend on further information (e.g. information on locations and number of radio devices that are not contained in or represented by the first radio map and from which a respective radio signal is still observable in the first environment and/or the second environment).

According to an exemplary embodiment of the invention, the group of radio devices is selected from the plurality of radio devices such that a predetermined density criterion for the density of radio coverage models in the portion of the second environment at least partially covering the first environment is met. For example, the group of radio devices is selected from the plurality of radio devices at least partially based on the first radio map information (e.g. because the selecting depends on the first radio map information) such that a predetermined density criterion for the density of radio coverage models in the portion of the second environment is met. For example, the predetermined density criterion may be met if the density of radio coverage models contained in or represented by the second radio map in the portion of the second environment at least partially covering the first environment is equal to or exceeds a predetermined density threshold. Alternatively or additionally, the predetermined density criterion may be met if the density of radio coverage models contained in or represented by the second radio map in the portion of the second environment at least partially covering the first environment is higher than the density in the remaining portion of the second environment, for example by a predetermined factor (e.g. 1.5 times higher or 2 times higher).

According to an exemplary embodiment of the invention, each of the radio coverage models of each radio device of the group of radio devices is one of a soft-boundary model and a hard-boundary model.

As disclosed above, a radio coverage model of a certain radio device may describe the coverage area within which radio signals transmitted (e.g. broadcasted) by this radio device are expected to be observable. Accordingly, a hard-boundary model of a certain radio device may be understood to describe (e.g. define) a boundary of the coverage area, wherein inside the boundary of the coverage area radio signals transmitted (e.g. broadcasted) by this radio device are expected to be observable and outside of the boundary of the coverage area radio signals transmitted (e.g. broadcasted) by this radio device are not expected to be observable. An example of such a hard-boundary model is a geometric model as disclosed below in more detail.

In contrast to a hard-boundary model, a soft-boundary model does not describe (e.g. define) a boundary of the coverage area. For example, a soft-boundary model of a certain radio device may describe the coverage area of the radio device by describing (e.g. representing or defining) an expected propagation (e.g. attenuation) of a radio signal transmitted by this radio device like a matrix model or a parametric model disclosed below in more detail.

According to an exemplary embodiment of the invention, each of the radio coverage models of each radio device of the group of radio devices is one of a matrix model, a geometric model and a parametric model.

For example, a matrix model (e.g. a signal strength matrix model) of a certain radio device represents an expected radio signal strength field of a radio signal transmitted (e.g. broadcasted) by this radio device. An example of such a matrix model is a radio image like a radio signal strength heatmap.

For example, a radio coverage model of a certain radio device may be referred to as a geometric model if it is a geometric shape representing the expected coverage area of this radio device within which it is expected that a radio signal transmitted (e.g. broadcasted) by this radio device is observable (e.g. receivable with a minimum quality, e.g. a minimum signal-to-noise ratio and/or a minimum signal power, e.g. at least −90 dbm or −95 dbm). Using such geometric models for example may have the effect that the radio coverage model is very simple, only requires a small amount of data and is easy to analyze.

For example, a parametric model of a certain radio device may represent or comprise one or more radio transmission parameters (e.g. path-loss exponent and transmission power) characteristic for the expected propagation of a radio signal transmitted by this radio device. An example of a parametric model of a certain radio device is a path loss model for a radio signal transmitted by this radio device. In this case, the radio transmission parameters may comprise a path loss exponent and an indication of a transmission power used by the transmitter of the radio device.

According to an exemplary embodiment of the invention, one or more radio devices of the group of radio devices are one of:

a Bluetooth beacon; and an access point of a wireless local area network (WLAN).

A Bluetooth beacon may comprise a Bluetooth and/or Bluetooth low energy (BLE) radio interface, which includes at least a Bluetooth and/or BLE transmitter. The Bluetooth and/or BLE transmitter may also be a part of a Bluetooth and/or BLE transceiver. The Bluetooth and/or BLE radio interface may be configured to transmit Bluetooth and or BLE radio signals.

Such beacons can be easily installed at various installation positions and require little to no maintenance. For example, a plurality of beacons may be easily distributed across a certain area and may cover a certain area (e.g. an environment of a radio map) with radio signals transmitted (e.g. broadcasted) by the beacons. Also, Bluetooth technologies are supported by many mobile devices by default such as most smartphones, most tablet computers, most notebook computers, most smart watches and most smart bands, etc. Using Bluetooth beacons may thus have the effect that many mobile devices may be able to receive radio signals transmitted by the Bluetooth beacons without any adaptation of hardware. The beacons may be stand-alone devices or be integrated into or attached to some other device. Bluetooth beacons, in particular in low energy mode, require comparably little energy and the use of Bluetooth low energy may enable a positioning with limited energy consumption at all involved devices.

A Bluetooth beacon that is employed for the invention may be any kind of Bluetooth beacon complying with any present or future standard. The Bluetooth standards are specified by the Bluetooth Special Interest Group and are presently available under https://www.bluetooth.com/.

For example, one or more radio devices of the group of radio devices may be an access point (e.g. a router) of a WLAN. Such an access point of a WLAN may comprise a WLAN radio interface, which for example includes a WLAN transceiver. The WLAN radio interface may be configured to transmit and/or receive WLAN radio signals. Accordingly, the radio signal transmitted by such an access point of a WLAN may be a WLAN radio signal. Like Bluetooth technologies, WLAN technologies are supported by many mobile devices by default such as most smartphones, most tablet computers, most notebook computers, most smart watches and most smart bands, etc. WLAN is for example specified by the standards of the IEEE 802.11 family (http://www.ieee.org/).

It is to be understood, however, that other types of radio devices than variations of Bluetooth beacons and WLAN access points may be used as well, for example tags or other devices that are configured to transmit ultra-wideband (UWB) signals or any wireless radio signals that might emerge in the future.

According to an exemplary embodiment of the invention, the first radio map is an indoor radio map. For example, the first radio map may be understood to be an indoor radio map if the first radio map is a radio map for a first indoor environment like an environment inside a building or a complex of buildings. It is to be understood that the first radio map as an indoor radio map may be an offline radio map or an online radio map.

As disclosed above, the fact that an indoor radio map exists for a first indoor environment may indicate that this first environment is of importance with respect to position estimating.

According to an exemplary embodiment of the invention, the first environment is a complex of buildings (e.g. a shopping center, a parking garage, an airport, a company site, etc.) or a building, for example the first environment is at least partially inside such a complex of buildings or a building.

According to an exemplary embodiment of the invention, the second radio map is for offline position estimating of a mobile device. In such a case, the second radio map may be understood to be an offline radio map. When using the second radio map for offline position estimating of the mobile device, the second radio map may be provided such that it is received or retrieved by the mobile device prior to position estimating. This may enable the mobile device to hold the second radio map information locally available (e.g. by storing the second radio map information in a memory of the mobile device) such that the position estimating based on the second radio map may be performed locally by the mobile device, for example without requiring a data connection to an apparatus providing the second radio map information (e.g. the apparatus performing the disclosed method) during position estimating.

It is to be understood that the presentation of the invention in this section is merely by way of examples and non-limiting.

Other features of the invention will become apparent from the following detailed description considered in conjunction with the accompanying figures. It is to be understood, however, that the figures are designed solely for purposes of illustration and not as a definition of the limits of the invention, for which reference should be made to the appended claims. It should be further understood that the figures are not drawn to scale and that they are merely intended to conceptually illustrate the structures and procedures described herein.

DETAILED DESCRIPTION OF THE FIGURES

The following description serves to deepen the understanding of the present invention and shall be understood to complement and be read together with the description of example embodiments of the invention as provided in the above SUMMARY section of this specification.

Figure 1:
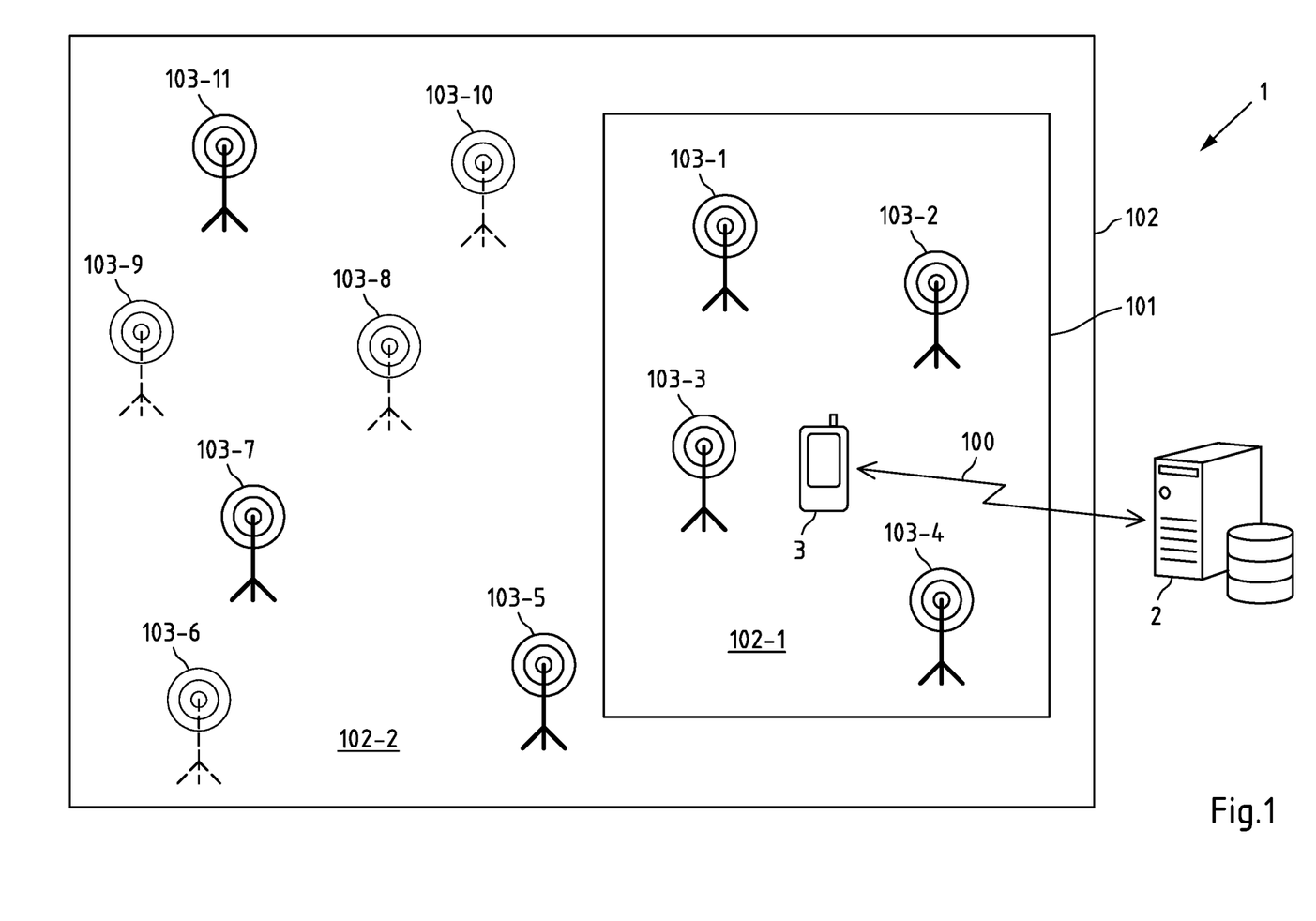
FIG. 1 is a block diagram of an exemplary embodiment of a system according to the invention.

FIG. 1 is a block diagram of an exemplary embodiment of a system 1 according to the invention.

System 1 comprises a server 2, a mobile device 3 and, optionally, a plurality of WLAN access points 103-1 to 103-11. It is to be understood that system 1 may comprise further servers, WLAN access points and mobile devices. In particular, system 1 is not limited to a single server 2, but may optionally comprise a plurality of servers (e.g. forming a server cloud). Accordingly, the server 2 may be part of such a plurality of servers (e.g. a server cloud) or may be represented by such a plurality of servers (e.g. a server cloud). In the following, it is thus referred to server 2, mobile device 3 and radio WLAN access points 103-1 to 103-11 without limiting the scope of the invention.

For example, server 2 and mobile device 3 may be configured to communicate with each other, for example via communication path 100. It is to be understood that communication path 100 may comprise one or more communication links (e.g. one or more wireless communication links or one or more wireline communication links or a combination thereof). For example, communication path 100 may include one or more communication links over one or more communication networks, like the internet, a cellular communication network or a public switched telephone network. In particular, communication path 100 is or includes a communication link over a cellular communication network like a 2G/3G/4G/5G cellular communication network. The 2G/3G/4G/5G cellular radio communication standards are developed by the 3GPP and presently available under http://www.3gpp.org/.

As disclosed below in more detail, server 2 is configured to perform one or more of the embodiments of a method according to the invention or parts thereof (e.g. the method or parts of the method disclosed below with reference to flowchart 400 of FIG. 4).

WLAN access points 103-1 to 103-11 may be fixedly installed at respective installation positions in at least one of a first environment 101 and a second environment 102. As apparent from FIG. 1, first environment 101 is part of second environment 102 such that a portion 102-2 of the second environment entirely covers (e.g. overlaps) first environment 101. WLAN access points 103-1 to 103-4 are installed at respective installation positions in first environment 101 and in portion 102-1 of the second environment 102. WLAN access points 103-5 to 103-11 are installed at respective installation positions in a remaining portion 102-2 of second environment 102. This remaining portion 102-2 of second environment 102 does not cover (e.g. overlap) first environment 101. In the following, it is assumed that first environment 101 is an indoor environment (e.g. inside a complex of buildings or a building) and that second environment 102 is a combined indoor and outdoor environment. In particular, it is assumed in the following that portion 102-1 of second environment 102 is an indoor environment and that remaining portion 102-2 of second environment 102 is an outdoor environment (e.g. outside of any complex of buildings or any building).

WLAN access points 103-1 to 103-11 may be configured for transmitting and receiving WLAN radio signals. For example, they may be configured for automatically and repeatedly transmitting WLAN radio signals. As disclosed above, WLAN is specified by the standards of the IEEE 802.11 family (http://www.ieee.org/).

For example, mobile device 3 may be one of a smartphone, a tablet computer, a notebook computer, a smart watch and a smart band. As an example, mobile device 3 may be configured to estimate its current position based on one or more WLAN radio signals (e.g. at least three WLAN radio signals) transmitted by respective WLAN access point(s) of WLAN access points 103-1 to 103-11 and currently observed by mobile device 3 and a second radio map represented by second radio map information as disclosed in more detail below. Mobile device 3 may be configured to receive the second radio map information representing the second radio map prior to estimating its current position via communication path 100 from server 2 and to store the second radio map information representing the second radio map such that mobile device is enabled to estimate its current position locally or offline (i.e. without further communication with server 3 during position estimating).

For example, when estimating its current position, mobile device 3 may observe at its current position one or more WLAN radio signals (e.g. at least three WLAN radio signals), each of which is transmitted (e.g. broadcasted) by respective WLAN access points of WLAN access points 103-1 to 103-11. Based on the second radio map information representing the second radio map containing or representing a respective geometric model as radio coverage model for each WLAN access point of WLAN access points 103-1 to 103-11, the current position of mobile device 3 may then be estimated to be the position (or area) at (or in) which the geometric models of the WLAN access points transmitting the observed one or more WLAN radio signals overlap. Accordingly, this position (or this area) may be used as position estimate for the current position of mobile device 3.

Figure 2:
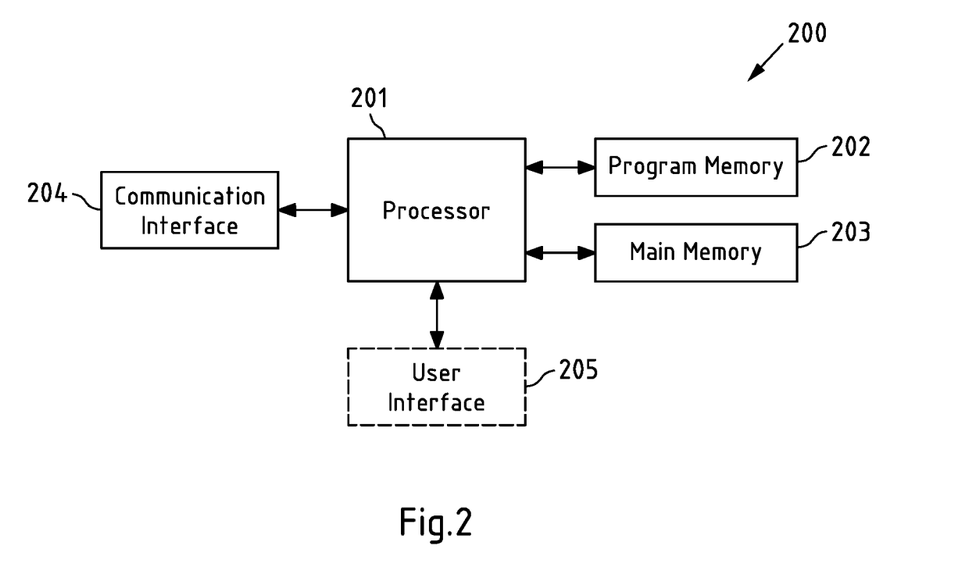
FIG. 2 is a block diagram of an exemplary embodiment of an apparatus according to the invention.

FIG. 2 is a block diagram of an exemplary embodiment of an apparatus 2 according to the invention. In the following, it is assumed that apparatus 2 corresponds to server 2 of system 1 of FIG. 1.

Server 2 comprises a processor 201. Processor 201 may represent a single processor or two or more processors, which are for example at least partially coupled, for example via a bus. Processor 201 executes a program code stored in program memory 202 (e.g. program code causing server 2 to perform one or more of the embodiments of a method according to the invention or parts thereof (e.g. the method or parts of the method disclosed below with reference to flowchart 400 of FIG. 4), when executed on processor 201), and interfaces with a main memory 203. Program memory 202 may also contain an operating system for processor 201. Some or all of memories 202 and 203 may also be included into processor 201.

One of or both of a main memory and a program memory of a processor (e.g. program memory 202 and main memory 203) could be fixedly connected to the processor (e.g. processor 201) or at least partially removable from the processor, for example in the form of a memory card or stick.

A program memory (e.g. program memory 202) may for example be a non-volatile memory. It may for example be a FLASH memory (or a part thereof), any of a ROM, PROM, EPROM, MRAM or a FeRAM (or a part thereof) or a hard disc (or a part thereof), to name but a few examples. For example, a program memory may for example comprise a first memory section that is fixedly installed, and a second memory section that is removable, for example in the form of a removable SD memory card.

A main memory (e.g. main memory 203) may for example be a volatile memory. It may for example be a DRAM memory, to give non-limiting example. It may for example be used as a working memory for a processor (e.g. processor 201) when executing an operating system and/or programs.

Processor 201 further controls a communication interface 201 which is for example configured to communicate via a communication network (e.g. a cellular communication network like a 2G/3G/4G/5G cellular communication network). For example, server 2 may use communication interface 204 to communicate with mobile device 3 (e.g. via communication path 100).

Furthermore, processor 201 controls an optional user interface 205 configured to present information to a user of server 2 and/or to receive information from such a user. User interface 205 may for example be the standard user interface via which a user of server 2 controls other functionality thereof. Examples of such a user interface are a touch-sensitive display, a keyboard, a touchpad, a display, etc.

The components 202 to 205 of server 2 may for example be connected with processor 201 by means of one or more serial and/or parallel busses.

It is to be understood that server 2 may comprise various other components.

Figure 3:
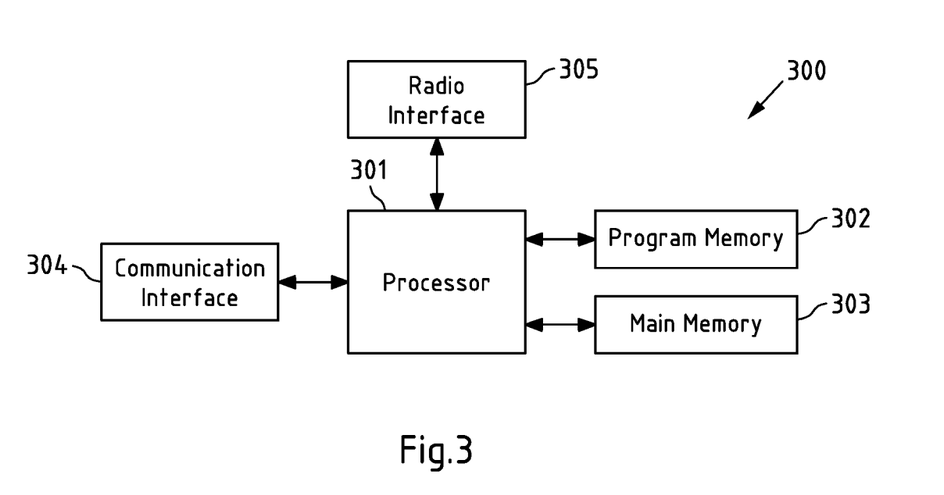
FIG. 3 is a block diagram of an exemplary embodiment of a mobile device according to the invention.

FIG. 3 is a block diagram of an exemplary embodiment of a mobile device 3 according to the invention. In the following, it is assumed that mobile device 3 corresponds to mobile device 3 of system 1 of FIG. 1.

Mobile device 3 comprises a processor 301. Processor 301 may represent a single processor or two or more processors, which are for example at least partially coupled, for example via a bus. Processor 301 executes a program code stored in program memory 302 and interfaces with a main memory 303. Program memory 302 may also comprise an operating system for processor 301. Some or all of memories 302 and 303 may also be included into processor 301.

Processor 301 controls a communication interface 304 which is for example configured to communicate via a communication network (e.g. a cellular communication network or a non-celluar communication network). For example, mobile device 3 may use communication interface 304 to communicate with server 2 (e.g. via communication path 100).

Moreover, processor 301 controls radio interface 305. As an example, it is assumed in the following that radio interface 305 is configured to receive and/or transmit WLAN radio signals. For example, radio interface 305 may at least comprise a WLAN component including a WLAN receiver (RX). The radio interface 305 may additionally comprise a WLAN transmitter (TX). The transmitter and receiver may also be part of a WLAN transceiver (TRX). The WLAN transmitter enables mobile device 3 to transmit WLAN radio signals. Likewise, the WLAN receiver enables mobile device 3 to receive WLAN radio signals. It is to be understood that any computer program code based processing required for receiving and processing received WLAN radio signals may be stored in an own memory of the radio interface 305 and executed by an own processor of the radio interface 305 or it may be stored for example in memory 302 and executed for example by processor 301.

That the WLAN receiver enables mobile device 3 to receive WLAN radio signals may be understood to mean that the WLAN receiver enables mobile device 3 to observe WLAN radio signals (e.g. if the radio signal is receivable with a minimum quality, e.g. a minimum signal-to-noise ratio and/or a minimum signal power, e.g. at least −90 dbm or −95 dbm). For example, mobile device 3 may estimate its current position based on one or more WLAN radio signals (e.g. at least three WLAN radio signals) observed by mobile device 3 at its current position as disclosed above in more detail.

The components 302 to 305 of mobile device 3 may for example be connected with processor 301 by means of one or more serial and/or parallel busses.

It is to be understood that mobile device 3 may comprise various other components. For example, mobile device 3 may optionally comprise a user interface (e.g. a touch-sensitive display, a keyboard, a touchpad, a display, etc.).

Figure 4:
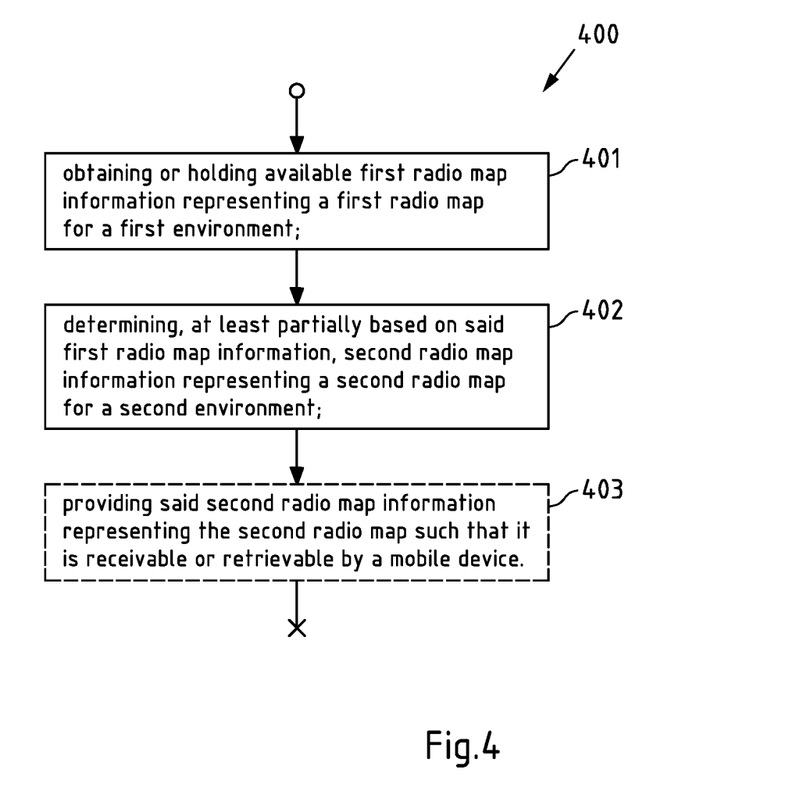
FIG. 4 is a flow chart illustrating an exemplary embodiment of a method according to the invention.

FIG. 4 is a flow chart 400 illustrating an exemplary embodiment of a method according to the invention. Without limiting the scope of the invention, it is assumed in the following that server 2 of system 1 as described above with respect to FIG. 1 and FIG. 2 performs the steps of flowchart 400.

In step 401, first radio map information representing a first radio map for first environment 101 is obtained or held available by server 2.

For example, the first radio map information is obtained by server 2 in step 401 by receiving the first radio map information from another apparatus (e.g. a server) via communication interface 204. Alternatively, the first radio map information is held available by server 2 in step 402, by storing the first radio map information in program memory 202.

The first radio map represented by the first radio map information may be configured to enable a mobile device (e.g. mobile device 3) to estimate its current position in first environment 101 based on WLAN radio signals currently observed by mobile device 3 in first environment 101. To this end, first radio map may for example contain or represent a respective radio coverage model for each of the WLAN access points 103-1 to 103-5 transmitting WLAN radio signals that are expected to be observable at one or more positions within first environment 101. Therein, a respective WLAN radio signal transmitted by a respective WLAN access point of WLAN access points 103-1 to 103-11 may be expected to be observable (e.g. receivable with a minimum quality, e.g. a minimum signal-to-noise ratio and/or a minimum signal power, e.g. at least −90 dbm or −95 dbm) at one or more positions within first environment 101 if the coverage area described (e.g represented) by this radio coverage model at least partially covers (e.g. overlaps) first environment 101. As disclosed above, an example of a respective radio coverage model of a respective WLAN access point of WLAN access points 103-1 to 103-11 is a geometric model like a geometric shape representing the expected coverage area of this WLAN access point device within which it is expected that a radio signal transmitted (e.g. broadcasted) by this radio device is observable.

The first radio map information representing the first radio map may have been generated based on a plurality of WLAN observation reports, each WLAN observation report representing observable WLAN radio signals at a certain observation position within first environment 101. Such a plurality of WLAN observation reports may have been collected by one or more dedicated surveying devices.

In step 402, second radio map information representing a second radio map for a second environment 102 is determined at least partially based on the first radio map information.

The second radio map contains or represents a respective radio coverage model for each WLAN access point of the group of WLAN access points 103-1, 103-2, 103-3, 103-4, 103-5, 103-7 and 103-11 (each of them marked in bold in FIG. 1). Portion 102-1 of the second environment 102 at least partially covers first environment 101, and a density of radio coverage models contained in or represented by the second radio map in portion 102-1 of second environment 102 is higher than a density of radio coverage models contained in or represented by the second radio map in remaining portion 102-2 of second environment 102.

The second radio map represented by the second radio map information determined in step 402 contains or represents for each WLAN access point of the group of WLAN access points 103-1, 103-2, 103-3, 103-4, 103-5, 103-7 and 103-11, each of them transmitting a respective WLAN radio signal that is expected to be observable at one or more positions within second environment 102. For example, this group of WLAN access points may result from selecting WLAN access points 103-1, 103-2, 103-3, 103-4, 103-5, 103-7 and 103-11 from the plurality of WLAN access points 103-1 to 103-11. Therein, a respective WLAN radio signal from each of WLAN access points 103-1 to 103-11 is observable at one or more positions within second environment 102. WLAN access points 103-1, 103-2, 103-3, 103-4, 103-5, 103-7 and 103-11 may be selected from the plurality of WLAN access points 103-1 to 103-11 such that it is expected that at any position of portion 102-1 of second environment 102 a first predetermined number (e.g. 5 or 6) of WLAN radio signals is observable and at any position of remaining portion 102-2 of second environment 102 a second predetermined number (e.g. 3 or 4) of WLAN radio signals is observable. The selecting of WLAN access points 103-1, 103-2, 103-3, 103-4, 103-5, 103-7 and 103-11 may be understood to be part of the determining in step 402.

Within the example given in FIG. 1 and considering as disclosed above that radio coverage models contained in or represented by the second radio map in a given portion of second environment 102 may be understood as radio coverage models that are contained in or represented by the second radio map and whose respective coverage areas overlap the given portion of second environment 102, the second radio map may contain or represent a respective radio coverage model for WLAN access points 103-1, 103-2, 103-3, 103-4 and 103-5 in portion 102-1 of second environment 102 and the second radio map may contain or represent a respective radio coverage model for WLAN access points 103-5, 103-6 and 103-11 in remaining portion 102-2 of second environment 102. Assuming for example a density of radio coverage models contained in or represented by the second radio map in portion 102-1 (or remaining portion 102-2) as number of radio coverage models contained in or represented by the second radio map in portion 102-1 (or remaining portion 102-2) per surface area of portion 102-1 (or remaining portion 102-2), the density of radio coverage models for WLAN access points 103-1, 103-2, 103-3, 103-4 and 103-5 in portion 102-1 of second environment 102 is higher than the density of radio coverage models for WLAN access points 103-5, 103-6 and 103-11 in remaining portion 102-2 of second environment 102.

Within the example given in FIG. 1, it may be likely that a greater number of WLAN radio signals is observable at any position of portion 102-1 of second environment 102 than in remaining portion 102-2 of second environment 102. This is particularly advantageous in the given example, in which portion 102-1 of second environment 102 is inside a building or a complex of buildings and remaining portion 102-2 of second environment 102 is at least partially outside of a building or a complex of buildings, because it is expected that the propagation or observation of WLAN radio signals may be more affected in portion 102-1 of second environment 102 (e.g. inside of a building or a complex of buildings) than in remaining portion 102-2 of second environment 102 (e.g. outside a building or a complex of buildings).

Accordingly, the second radio map may be understood as an indoor optimized radio map, which may be used as offline radio map by providing the second radio map information representing the second radio map such that it is receivable or retrieveable by mobile device 3 in an optional step 403. For example, server 2 may send the second radio map information via communication path 100 to mobile device 3 in optional step 403.

For example, it is advantageous to determine the second radio map information representing the second radio map at least partially based on the first radio map information representing the first radio map, which may be for example an indoor radio map as assumed above. That is because the second radio map may be determined based on an already existing (e.g. existing before performing the steps of flowchart 400) indoor radio map as first radio map. In particular, the fact that an indoor radio map exists for first environment 101 as indoor environment may be considered to indicate that this first environment 101 is of importance with respect to position estimating (e.g. because it is expected that propagation or observation of radio signals may be affected in this environment) and that a second radio map should be optimized for positioning estimating in this first environment 101. Thus, performing the disclosed method steps of flowchart 400 may for example be advantageous when making use of already existing knowledge on which environments are important with respect to position estimating. For example, the second radio map may be determined in an automatic fashion without manual user input (e.g. without for example manually selecting one or more radio devices) by a user of the apparatus performing the disclosed method, which would be cumbersome and prone to errors.

Figure 5:
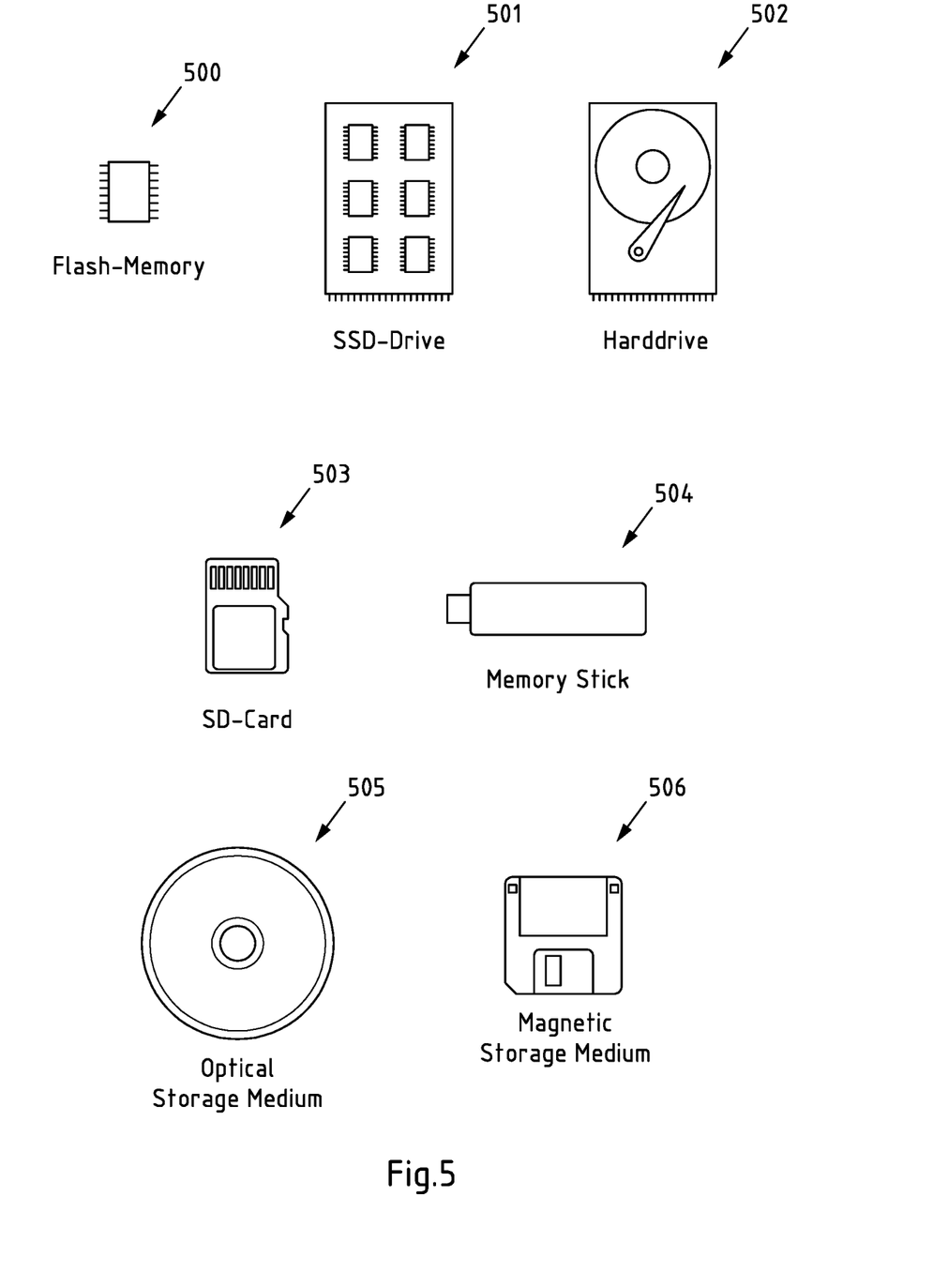
FIG. 5 is a schematic illustration of examples of tangible and non-transitory storage media according to the invention.

FIG. 5 is a schematic illustration of examples of tangible and non-transitory computer-readable storage media according to the present invention that may for example be used to implement memory 202 of FIG. 2 and memory 302 of FIG. 3. To this end, FIG. 5 displays a flash memory 500, which may for example be soldered or bonded to a printed circuit board, a solid-state drive 501 comprising a plurality of memory chips (e.g. Flash memory chips), a magnetic hard drive 502, a Secure Digital (SD) card 503, a Universal Serial Bus (USB) memory stick 504, an optical storage medium 505 (such as for example a CD-ROM or DVD) and a magnetic storage medium 506.

Moreover, any of the actions or steps described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

The wording "A, or B, or C, or a combination thereof" or "at least one of A, B and C" may be understood to be not exhaustive and to include at least the following: (1) A, or (2) B, or (3) C, or (4) A and B, or (5) A and C, or (6) B and C, or (7) A and B and C.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

That which is claimed is:

1. A method performed by an apparatus, said method comprising:
   obtaining or holding available first radio map information representing a first radio map for a first environment; and
   determining, at least partially based on said first radio map information, second radio map information representing a second radio map for a second environment, wherein said second radio map contains or represents a respective radio coverage model for each radio device of a group of radio devices, wherein a portion of said second environment at least partially covers said first environment, and wherein a density of radio coverage models contained in or represented by said second radio map in said portion of said second environment at least partially covering said first environment is higher than a density of radio coverage models contained in or represented by said second radio map in a remaining portion of said second environment,
   wherein said density of radio coverage models contained in or represented by said second radio map in said portion of said second environment at least partially covering said first environment is a function of the following:
   a number of radio coverage models contained in or represented by said second radio map in said respective portion of said second environment at least partially covering said first environment; and
   the surface area of said portion of said second environment at least partially covering said first environment; and
   wherein said density of radio coverage models contained in or represented by said second radio map in said remaining portion of said second environment is a function of the following:
   a number of radio coverage models contained in or represented by said second radio map in said respective remaining portion; and
   the surface area of said respective remaining portion of said second environment.

2. The method of claim 1, the method further comprising:
   providing said second radio map information representing the second radio map such that it is receivable or retrievable by a mobile device.

3. The method of claim 1, wherein said determining second radio map information comprises:
   selecting, at least partially based on said first radio map information, said group of radio devices from a plurality of radio devices, wherein a respective radio signal from each radio device of said plurality of radio devices is observable in said second environment.

4. The method of claim 1, wherein said group of radio devices is selected from said plurality of radio devices such that a predetermined density criterion for said density of radio coverage models in said portion of said second environment at least partially covering said first environment is met.

5. The method of claim 1, wherein each of said radio coverage models for each radio device of said group of radio devices is one of a matrix model, a geometric model and a parametric model.

6. The method according to claim 1, wherein one or more radio devices of said group of radio devices are one of:
   a Bluetooth beacon; and
   an access point of a wireless local area network (WLAN).

7. The method of claim 1, wherein said first radio map is an indoor radio map.

8. The method of claim 1, wherein said first environment is a complex of buildings, a building or a building floor.

9. The method of claim 1, wherein said second radio map is to be used for offline position estimating of said mobile device.

10. An apparatus comprising at least one processor and at least one memory containing computer program code, the at least one memory and the computer program code with the at least one processor configured to cause the apparatus at least to perform:
    obtaining or holding available first radio map information representing a first radio map for a first environment; and
    determining, at least partially based on said first radio map information, second radio map information representing a second radio map for a second environment, wherein said second radio map contains or represents a respective radio coverage model for each radio device of a group of radio devices, wherein one or more radio devices of said group of radio devices are a Bluetooth beacon or a wireless local area network (WLAN) access point, wherein a portion of said second environment at least partially covers said first environment, and wherein a density of radio coverage models of the Bluetooth beacons or the WLAN access points contained in or represented by said second radio map in said portion of said second environment at least partially covering said first environment is higher than a density of radio coverage models of the Bluetooth beacons or the WLAN access points contained in or represented by said second radio map in a remaining portion of said second environment;

wherein said density of radio coverage models contained in or represented by said second radio map in said portion of said second environment at least partially covering said first environment is a function of at least one of the following:

a number of radio coverage models contained in or represented by said second radio map in said portion of said second environment at least partially covering said first environment; and a surface area of said portion of said second environment at least partially covering said first environment; and wherein said density of radio coverage models contained in or represented by said second radio map in said remaining portion of said second environment is a function of at least one of the following:

a number of radio coverage models contained in or represented by said second radio map in said remaining portion; and a surface area of said remaining portion of said second environment.

11. The apparatus of claim 10, wherein the at least one memory and the computer program code with the at least one processor are further configured to cause the apparatus to:

provide said second radio map information representing the second radio map such that it is receivable or retrievable by a mobile device.

12. The apparatus of claim 10, wherein the at least one memory and the computer program code with the at least one processor are configured to cause the apparatus to determine second radio map information by:

selecting, at least partially based on said first radio map information, said group of radio devices from a plurality of radio devices, wherein a respective radio signal from each radio device of said plurality of radio devices is observable in said second environment.

13. The apparatus of claim 10, wherein said group of radio devices is selected from said plurality of radio devices such that a predetermined density criterion for said density of radio coverage models in said portion of said second environment at least partially covering said first environment is met.

14. A non-transitory computer readable storage medium storing computer program code, wherein the computer program code causes, upon execution, an apparatus to perform:

obtaining or holding available first radio map information representing a first radio map for a first environment; and determining, at least partially based on said first radio map information, second radio map information representing a second radio map for a second environment, wherein said second radio map contains or represents a respective radio coverage model for each radio device of a group of radio devices, wherein a portion of said second environment at least partially covers said first environment, and wherein a density of radio coverage models contained in or represented by said second radio map in said portion of said second environment at least partially covering said first environment is higher than a density of radio coverage models contained in or represented by said second radio map m a remaining portion of said second environment, wherein said density of radio coverage models contained in or represented by said second radio map in said portion of said second environment at least partially covering said first environment is a function of the following:

a number of radio coverage models contained in or represented by said second radio map in said respective portion of said second environment at least partially covering said first environment; and the surface area of said portion of said second environment at least partially covering said first environment; and wherein said density of radio coverage models contained in or represented by said second radio map in said respective remaining portion of said second environment is a function of the following:

a number of radio coverage models contained in or represented by said second radio map in said respective remaining portion; and the surface area of said respective remaining portion of said second environment.

15. The non-transitory computer readable storage medium of claim 14, wherein the computer program code further causes, upon execution, the apparatus to perform:

provide said second radio map information representing the second radio map such that it is receivable or retrievable by a mobile device.

* * * * *